US012536678B2

(12) United States Patent
Liu et al.

(10) Patent No.: US 12,536,678 B2
(45) Date of Patent: Jan. 27, 2026

(54) MODEL ALIGNMENT METHOD

(71) Applicant: Hong Kong Centre for Logistics Robotics Limited, New Territories (HK)

(72) Inventors: Yunhui Liu, New Territories (HK); Xueyan Tang, New Territories (HK); Wenguan Wang, New Territories (HK); Chongshan Liu, New Territories (HK)

(73) Assignee: Hong Kong Centre for Logistics Robotics Limited, New Territories (HK)

( * ) Notice: Subject to any disclaimer, the term of this patent is extended or adjusted under 35 U.S.C. 154(b) by 236 days.

(21) Appl. No.: 18/461,660

(22) Filed: Sep. 6, 2023

(65) Prior Publication Data

US 2024/0078691 A1    Mar. 7, 2024

Related U.S. Application Data

(63) Continuation of application No. PCT/IB2022/058388, filed on Sep. 7, 2022.

(51) Int. Cl.
*G06T 7/33*        (2017.01)
*G06T 7/13*        (2017.01)
(Continued)

(52) U.S. Cl.
CPC .............. *G06T 7/337* (2017.01); *G06T 7/13* (2017.01); *G06T 7/50* (2017.01); *G06T 7/74* (2017.01);
(Continued)

(58) Field of Classification Search
CPC .......... G06T 19/20; G06T 2219/2004; G06T 2219/2016; G06T 7/13; G06T 7/33; G06T 7/337; G06T 7/50; G06T 7/74
See application file for complete search history.

(56) References Cited

U.S. PATENT DOCUMENTS 8,830,229 B2    9/2014 Drost
9,280,827 B2    3/2016 Tuzel et al.
(Continued)

FOREIGN PATENT DOCUMENTS

CN    113538538 A    10/2021
CN    114511689 A    5/2022

OTHER PUBLICATIONS

Liu, Diyi et al. "Point Pair Feature-Based Pose Estimation with Multiple Edge Appearance Models (PPF-MEAM) for Robotic Bin Picking" MDPI, sensors, vol. 18, No. 8, Aug. 18, 2018 (Aug. 18, 2018), 1-20 chapters 1-5.
(Continued)

*Primary Examiner* — Sing-Wai Wu
(74) *Attorney, Agent, or Firm* — Hinckley Allen & Snyder; Stephen Holmes

(57)    ABSTRACT

Aligning a source and target model includes calculating a shape descriptor for a plurality of edge points, grouping the edge points by shape descriptor and selecting representative points for each group. Target and source point pair features (PPFs) are calculated between pairs of representative points on the target and source models, where PPFs defines the relative position and orientation of point pairs. Target PPFs are matched with each source PPF and the point pairs associated with the matched PPFs are transformed to align the location and edge direction of a target PPF point with the location and edge direction of a source PPF point. An angle is determined to align the second target PPF point with the second source PPF point, and a modal angle is found among the determined rotation angles. An output transformation is calculated using the transformations associated with the modal angle.

11 Claims, 7 Drawing Sheets

(51) Int. Cl.
*G06T 7/50* (2017.01)
*G06T 7/73* (2017.01)
*G06T 19/20* (2011.01)

(52) U.S. Cl.
CPC ...... *G06T 19/20* (2013.01); *G06T 2219/2016* (2013.01)

(56) References Cited

U.S. PATENT DOCUMENTS

2017/0161945 A1 6/2017 Robert et al.
2022/0084221 A1* 3/2022 Deng ................ G06V 10/7715

OTHER PUBLICATIONS

Xu, Guanyu et al. "Pose Estimation Algorithm for Random Bins Based on Point Pair Features" Laser and Optoelectronics Progress, vol. 57, No. 18, Sep. 30, 2020 (Sep. 30, 2020), pp. 1-9.
PCT/IB2022/058388 International Search Report, dated Apr. 27, 2023.
PCT/IB2022/058388 Written Opinion, dated May 15, 2023.
Choi, C., Taguchi, Y., Tuzel, O. et al., "Voting-Based Pose Estimation for Robotic Assembly Using a 3D Sensor," IEEE International Conference on Robotics and Automation, May 14-18, 2012.
Birdal, Tolga, Ilic, Slobdan, "Point Pair Features Based Objects Detection and Pose Estimation Revisited," Conference Publishing Services, 2015 International Conference on 3D Vision.
Drost, B., Ulrich, M., Navab, N., Ilic, S., "Model Globally, Match Locally: Efficient and Robust 3D Object Recognition," 2010 IEEE Xplore.
Tuzel, Oncel; Liu, Ming-Yu; Taguchi, Yuichi; Raghunathan, Arvind, "Learning to Rank 3D Features," 2014 Springer International Publishing Switzerland 2014.

* cited by examiner

MODEL ALIGNMENT METHOD

FIELD OF THE DISCLOSURE

The present disclosure relates to three dimensional modelling and, in particular, to the alignment of a source model with a target model without an external frame of reference.

BACKGROUND OF THE DISCLOSURE

In many situations it is beneficial to align two three-dimensional (3D) models that have an unknown relative orientation. For example, it is difficult to perform a 3D full-dimension measurement and assessment of surface defects for complex mechanical components, and a technique of comparative measurement is often used. A 3D scanner is used to generate an actual model of the component can be compared with a template model, e.g. a design model generated using computer-aided design (CAD) software. Dimension errors and surface defects can be found in the model differences using this technique, however, the models must be precisely aligned and the rotation and translation between the template model and the actual model are generally unknown.

U.S. Pat. No. 8,830,229B2 describes a "point pair feature" (PPF) method for aligning a template model and an actual model. Both the template model and the actual model are sampled and represented by discrete points with a point direction normal to the surface at that point, and the template model is described using PPFs which define the relative position and orientation of every pair of points in the model. The PPFs for the template model are stored in a hash table, such that one or more PPFs of the actual model can be used to search the hash table to find similar PPFs from the template model.

Each point pair from the actual model is transformed by translating a first one of the points to the coordinate origin and then rotating to make the point direction aligned with the reference axis, e.g. the x-axis, and a point pair from the template model with a similar PPF is transformed by translating a first one of the points to the coordinate origin and then rotating to make the point direction aligned with the reference axis, e.g. the x-axis. A rotation angle $\alpha$ is computed between the two transformed PPFs, such that a series of the rotation angles are computed, and the angle $\alpha$ having the most votes can be found via a voting scheme, to calculate a transformation matrix from one point pair in the actual model to one corresponding point pair in the template model.

There are a lot of transformation matrices, so the transformation matrices are clustered and the average matrix of the most common cluster is taken as the transformation matrix from the actual model to the template model.

This method has limitations for planar or smooth surfaces, e.g., if the two points are from one plane the PPF has three ambiguous angles. To solve this problem, a boundary point-to-boundary point (B2B) feature using only boundary points is described in Choi, 2012.

However, even using the B2B feature, there can still be a wrong alignment problem, e.g. for generally symmetric models with small asymmetric features. If all the boundary points are considered equally, the alignment result may be wrong because most points are aligned well but the small asymmetric features are not. Thus, the points in the small asymmetric features are more important and the misalignment problem can be solved by assigning proper weights to points or features. U.S. Pat. No. 9,280,827B2 describes a learning-based weighting method, however, a lot of 3D data is captured for the actual models, and the poses must be labelled as the input for training the network, so there is a lot of effort required to train the network.

It is an object of the present disclosure to provide a model alignment method which overcomes these problems.

SUMMARY OF THE DISCLOSURE

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims.

In accordance with a first aspect of the present disclosure, there is provided a computer-implemented method of aligning a source model with a target model, including receiving the source model and the target model; identifying a plurality of edge points on each model, where each edge point is associated with an edge direction at a location of the edge point; calculating a shape descriptor associated with each identified edge point; grouping the edge points for each model according to the associated shape descriptors and selecting one or more representative points for each group of edge points; calculating a target point pair feature, PPF, between each pair of representative points on the target model, wherein the PPF defines the relative position and orientation of the pair of points; calculating a source PPF between each of one or more specified representative points on the source model and each other representative point on the source model: searching for one or more target PPFs to match with each calculated source PPF; for each matched source PPF and target PPF: transforming the pair of points associated with the source PPF and/or the target PPF to align the location and edge direction of a first point associated with the target PPF with the location and edge direction of the reference point associated with the source PPF; and determining a rotation angle to align a second point associated with the target PPF with a second point associated with the source PPF; identifying a modal angle among the plurality of determined rotation angles; and calculating an output transformation from the source model to the target model using the transformations applied to the points associated with each matched source PPF and target PPF for which the associated rotation angle is equal to the modal angle.

In accordance with a second aspect of the present disclosure, there is provided a data processing apparatus comprising a processor configured to align a source model with a target model by receiving the source model and the target model; identifying a plurality of edge points on each model, where each edge point is associated with an edge direction at a location of the edge point; calculating a shape descriptor associated with each identified edge point; grouping the edge points for each model according to the associated shape descriptors and selecting one or more representative points for each group of edge points; calculating a target point pair feature, PPF, between each pair of representative points on the target model, wherein the PPF defines the relative position and orientation of the pair of points; calculating a source PPF between each of one or more specified representative points on the source model and each other representative point on the source model: searching for one or more target PPFs to match with each calculated source PPF; for each matched source PPF and target PPF: transforming the pair of points associated with the source PPF and/or the target PPF to align the location and edge direction of a first point associated with the target PPF with the location and edge direction of the reference point associated with the source PPF; and determining a rotation angle to align a second point associated with the target PPF with a second point associated with the source PPF; identifying a modal angle among the plurality of determined rotation angles; and calculating an output transformation from the source model to the target model using the transformations applied to the points associated with each matched source PPF and target PPF for which the associated rotation angle is equal to the modal angle.

In accordance with a third aspect of the present disclosure, there is provided a computer-readable medium comprising instructions which, when executed by a processor, cause the processor to align a source model with a target model by receiving the source model and the target model; identifying a plurality of edge points on each model, where each edge point is associated with an edge direction at a location of the edge point; calculating a shape descriptor associated with each identified edge point; grouping the edge points for each model according to the associated shape descriptors and selecting one or more representative points for each group of edge points; calculating a target point pair feature, PPF, between each pair of representative points on the target model, wherein the PPF defines the relative position and orientation of the pair of points; calculating a source PPF between each of one or more specified representative points on the source model and each other representative point on the source model: searching for one or more target PPFs to match with each calculated source PPF; for each matched source PPF and target PPF: transforming the pair of points associated with the source PPF and/or the target PPF to align the location and edge direction of a first point associated with the target PPF with the location and edge direction of the reference point associated with the source PPF; and determining a rotation angle to align a second point associated with the target PPF with a second point associated with the source PPF; identifying a modal angle among the plurality of determined rotation angles; and calculating an output transformation from the source model to the target model using the transformations applied to the points associated with each matched source PPF and target PPF for which the associated rotation angle is equal to the modal angle.

Identifying the edge points may include detecting a plurality of edges and sampling each edge to generate the plurality of edge points.

The shape descriptor for each point may be calculated using a plurality of nearby points within a predetermined radius.

The shape descriptor may be calculated using a ratio between a length spanning the nearby points along the edge direction of the point and a width spanning the nearby points perpendicular to the edge direction of the point.

The shape descriptor may be calculated using a histogram of the distances between each nearby point and a line extending through the point extending in the edge direction of the point.

The shape descriptor may be calculated using values of linearity, planarity, surface variation and anisotropy.

Each point pair feature may be calculated using the distance between the points, the angle between the edge directions of the points, and the angles between the edge direction of each point and a connecting line extending between the points.

Each point pair feature may also include the calculated shape descriptor of the points.

The target PPFs may be stored in a hash table, which is searchable using the source PPF.

Transforming the pairs of points may include translating the first point associated with the target PPF and the reference point associated with the source PPF to a common origin point and rotating both pairs to align the edge direction of the first point associated with the target PPF and the edge direction of the reference point associated with the source PPF direction with a common first axis.

Identifying the modal angle may include quantizing the range of possible angles and accumulating a vote for one rotation angle per each matched source PPF and target PPF.

Calculating the output transformation may include calculating a transformation from the source model to the target model for each matched source PPF and target PPF for which the associated rotation angle is equal to the modal angle, and clustering the calculated transformations.

The source model may be an actual model based on real-word data and the target model may be a template model based on a computer generated template.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended Figures. Understanding that these Figures depict only exemplary embodiments of the disclosure and are not therefore to be considered to be limiting of its scope, the principles herein are described and explained with additional specificity and detail through the use of the accompanying Figures.

Preferred embodiments of the present disclosure will be explained in further detail below by way of examples and with reference to the accompanying Figures, in which:—

DETAILED DESCRIPTION OF THE PREFERRED EMBODIMENTS

Various embodiments of the disclosure are discussed in detail below. While specific implementations are discussed, it should be understood that this is done for illustration purposes only. A person skilled in the relevant art will recognize that other components and configurations may be used without departing from the scope of the disclosure.

Figure 1:
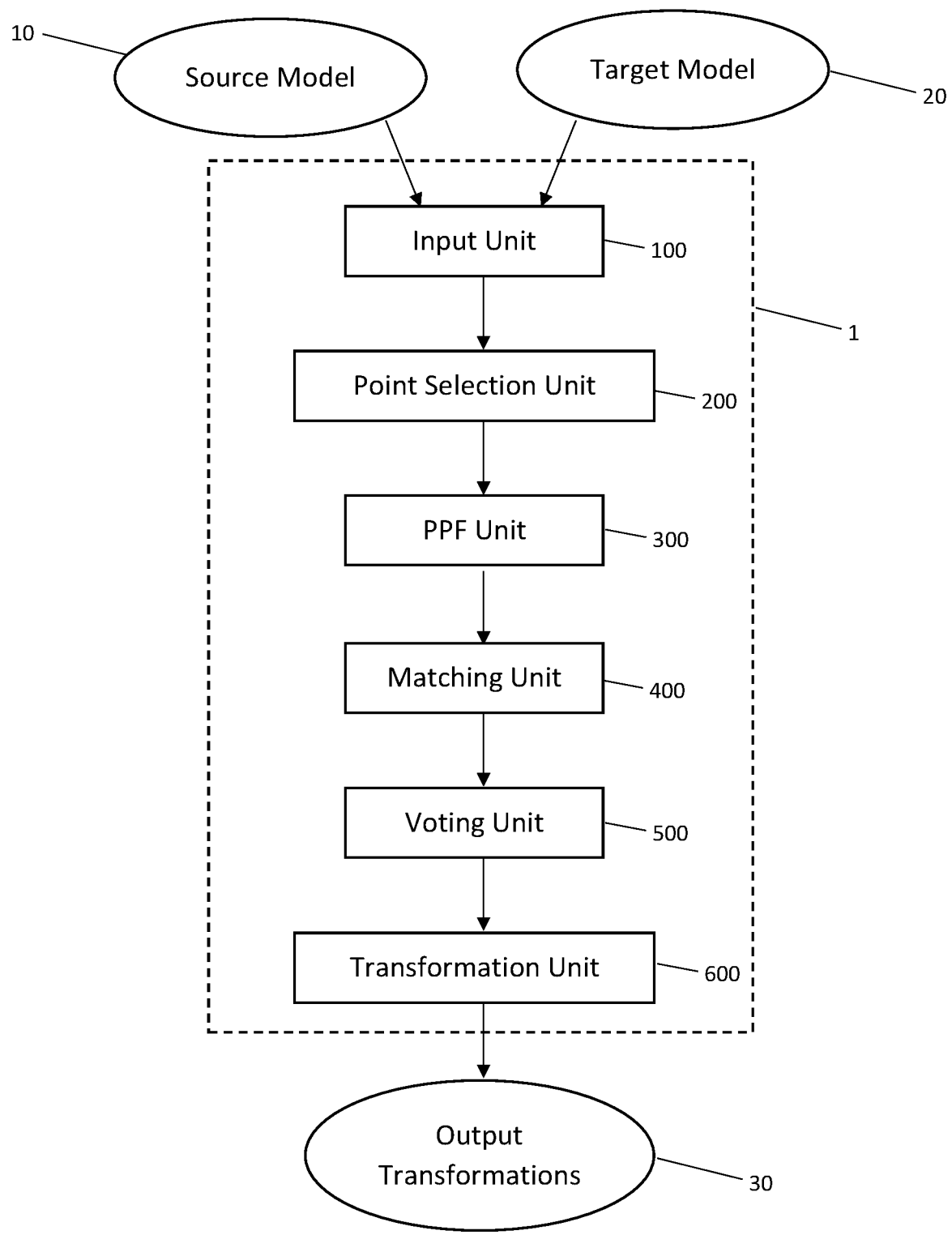
FIG. 1 shows a data processing apparatus according to an embodiment.

Referring to the drawings, there is shown in FIG. 1 a data processing apparatus 1 for aligning a source model 10 with a target model 20. The data processing apparatus 1 comprises an input unit 100, a point selection unit 200, a point pair feature (PPF) unit 300, a matching unit 400, a voting unit 500 and a transformation unit 600.

The input unit 100 is configured to receive a source model 10 and a target model 20. In some examples, the source model 10 may be an actual model based on real-word data and the target model 20 may be a template model based on a computer generated template. For example, the models may both relate to a mechanical part e.g. a complex mechanical component, where a 3D scanner may used to generate an actual model of the component and a template model may be generated using computer-aided design (CAD) software.

The point selection unit 200 is configured to identify a plurality of edge points on each model. Each identified edge point is associated with an edge direction at a location of the edge point.

In some examples, the point selection unit 200 may be configured to detect a plurality of edges and sample each edge to generate the plurality of edge points.

The point selection unit 200 is further configured to calculate a shape descriptor associated with each identified edge point.

Figure 2:
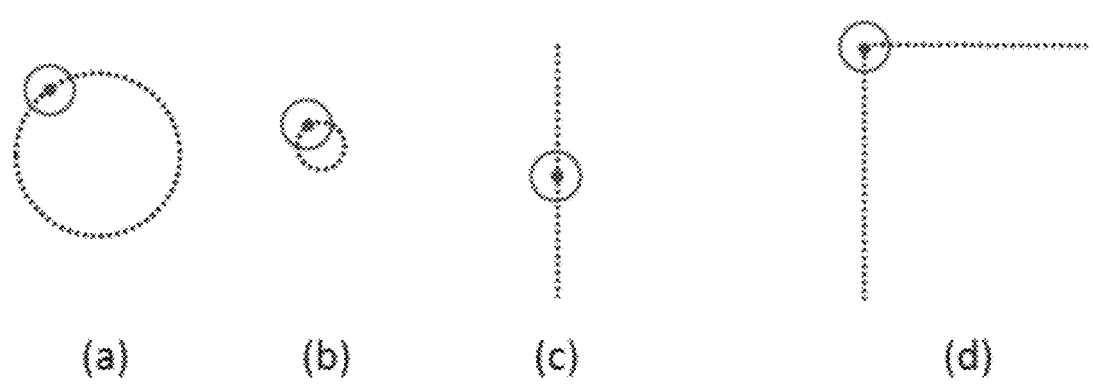
FIG. 2 illustrates examples of edge points.

FIG. 2 shows four groups of edge points classified by shape. Each point together with its neighbour points may be represented by the shape descriptor. In some examples, the point selection unit 200 may use a plurality of nearby points within a predetermined radius. This is shown in FIG. 2 as the larger edge point and its neighbour points enveloped in a circle. The predetermined radius may be set based on the object size and/or 3D point density. There are several methods to compute the shape descriptor.

In some examples, the point selection unit 200 may use a ratio between a length spanning the nearby points along the edge direction of the point and a width spanning the nearby points perpendicular to the edge direction of the point.

Figure 3A:
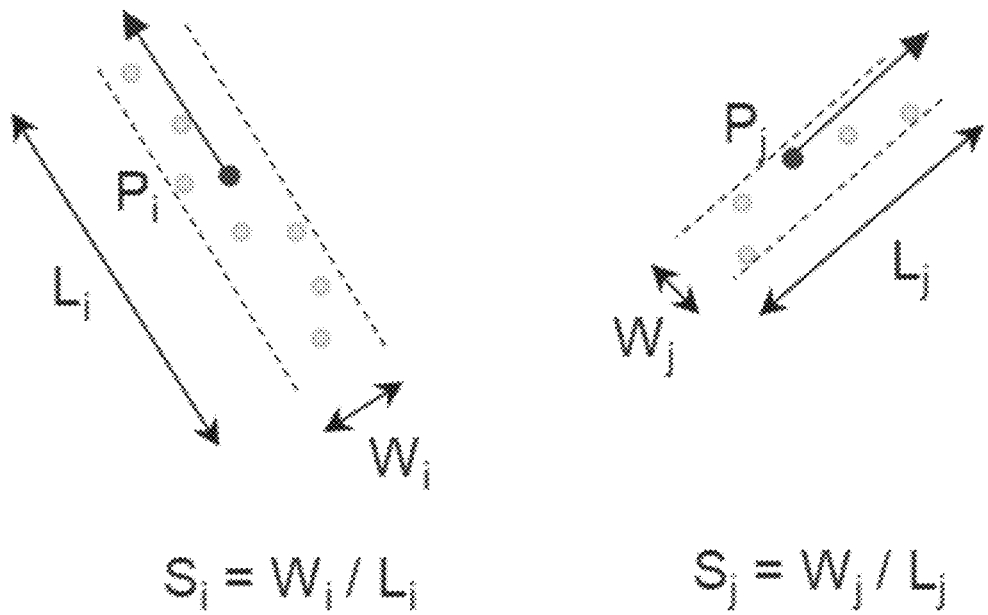
FIGS. 3A and 3B illustrate example calculations of shape descriptors according to some embodiments.

FIG. 3A shows the calculation of a width-to-length ratio shape descriptor. Eigenvalues and eigenvectors may be computed for the edge point (designated as $P_i$) and its neighbour points. The largest eigenvalue may be designated as $\lambda_1$ and the smallest one as $\lambda_3$. The span along $\lambda_1$ may be defined as the length, and the width may be defined as the span along $\lambda_3$. If $P_i$ is in a line as shown in FIG. 2(c) or in a large circle as shown in FIG. 2(a), the width-to-length ratio shape descriptor has a small value. The width-to-length ratio shape descriptor values are large if $P_i$ is in corner as shown in FIG. 2(d) or in small circle as shown in FIG. 2(b).

In some examples, the point selection unit 200 may use a histogram of the distances between each nearby point and a line extending through the point extending in the edge direction of the point.

Figure 3B:
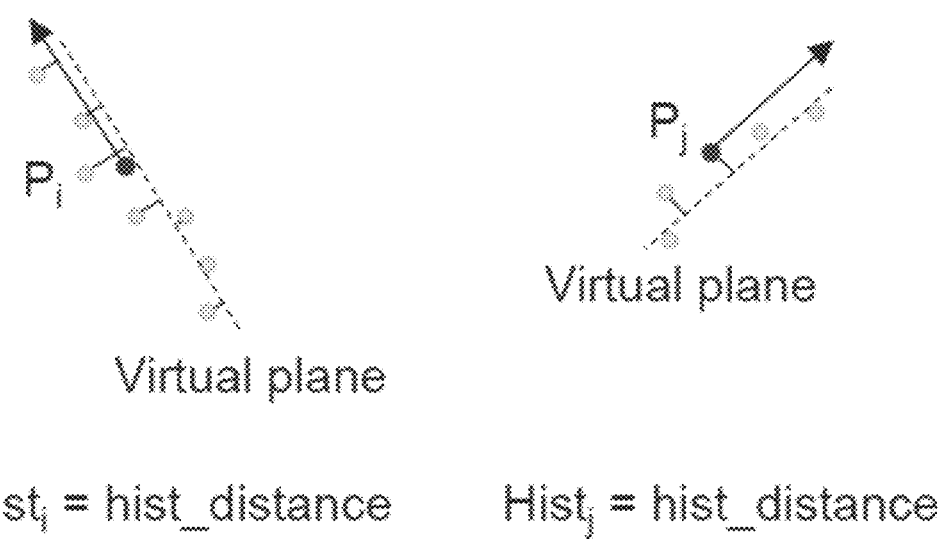

FIG. 3B shows the calculation of a histogram-based shape descriptor. A virtual plane may be fit using $P_i$ and its neighbour points. The distance of each point to the virtual plane may be computed and the distances may be stored in a histogram. The distance histogram represents each point's geometry. If $P_i$ is in a line or a plane, the histogram tends to have a peak. If $P_i$ is in a smooth surface, the histogram is smooth.

In some examples, the point selection unit 200 may use values of linearity, planarity, surface variation and anisotropy. These geometric parameters may be based on eigenvalues e.g. where $\lambda_1$, $\lambda_2$ and $\lambda_3$ are the eigenvalues of $P_i$ and its neighbour points. $\lambda 1$ is the largest eigen value.

In some examples, the linearity may be calculated as:

$L=\lambda 1-\lambda 2/\lambda 1$

In some examples, the planarity may be calculated as:

$P=\lambda 2-\lambda 3/\lambda 1$

In some examples, the surface variation may be calculated as:

$S=\lambda 2/\lambda 1$

In some examples, the anisotropy may be calculated as:

$A=\lambda 1-\lambda 3/\lambda 1$

The point selection unit 200 is further configured to group the edge points for each model according to the associated shape descriptors. The point selection unit 200 is configured to select one or more representative points for each group of edge points. In some examples, a predefined number of representative points may be selected randomly from each group of edge points. In some examples, weights may be assigned to each of the edge points based on the shape descriptors. The weight scheme may assign the same weight to each geometric group, and each geometric group may be represented by the same number of selected points. In this way, each group has the same contribution to represent the model. In addition, few points are selected, and so the speed of the apparatus can be enhanced. Accuracy can also be improved, because only discriminative points are considered. Furthermore, the weighting scheme can be implemented in an online process with no training needed.

The PPF unit 300 is configured to calculate a target PPF between each pair of representative points on the target model 20. The PPF defines the relative position and orientation of the pair of points.

In some examples, each PPF may be calculated using the distance between the points, the angle between the edge directions of the points, and the angles between the edge direction of each point and a connecting line extending between the points.

Figure 4A:
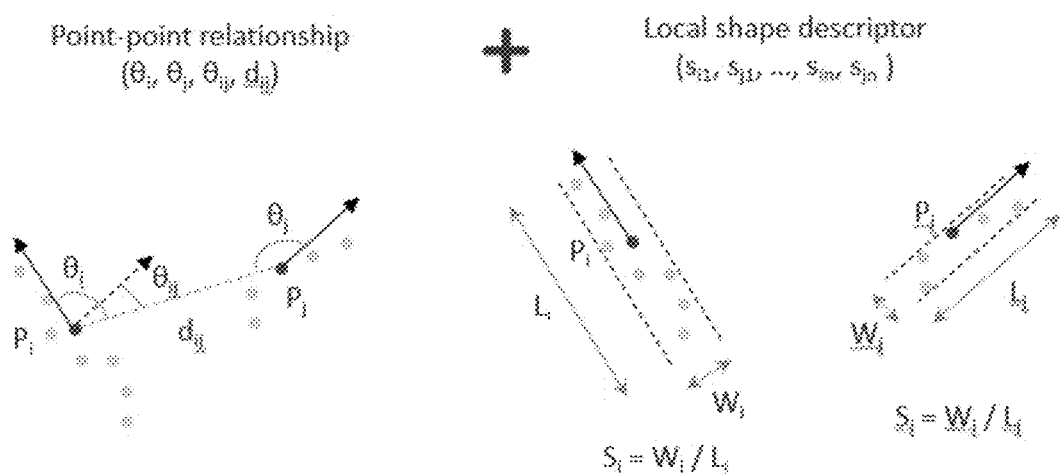
FIGS. 4A and 4B illustrate the calculation of a point pair function, according to some embodiments.

FIG. 4A shows how a point-to-point relationship can be calculated. The point-to-point relationship may be defined by 3 angles and 1 distance. Each edge point may have a principle direction based on its neighbouring points. For a pair of edge points $P_i$ and $P_j$, the first two angles may be calculated using a connecting line between the two points. The first angle $\theta_i$ may be the angle between the principle direction of $P_i$ and the connecting line. The second angle $\theta_j$ may be the angle between the principle direction of $P_j$ and the connecting line. The third angle $\theta_{ij}$ may be the angle between the principle direction of Pi and the principle direction of $P_j$. The distance $d_{ij}$ may be the distance between the two edge points along the connecting line.

In some examples, each PPF may further include the calculated shape descriptor of the points. FIG. 4A also shows the local shape descriptor which may be combined with the point-to-point relationship to form the PPF. The local shape descriptor is substantially as described above.

Figure 4B:
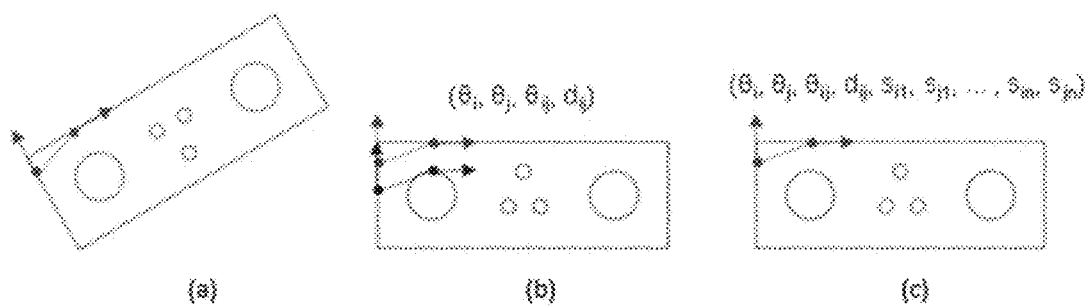

The inclusion of the local shape descriptor can improve the performance of the PPF, as shown in FIG. 4B. If only the point-to-point relationship is used for the example pair of points in a template mode shown in (a), then two corresponding point pairs may be found in the actual model shown in (b). In some examples, more than two corresponding point pairs may be found in the actual model. As shown in (b), the upper point pair is correct but the lower pair is not correct. If the local shape descriptor is included in the PPF, only the correct point pair is found in the actual model, as shown in (c).

The PPF unit 300 is further configured to calculate a source PPF between each of one or more specified representative points on the source model 10 and each other representative point on the source model 10.

The matching unit 400 is configured to match one or more target PPFs with each calculated source PPF. The matching unit 400 is configured to search for one or more target PPFs to match with each calculated source PPF.

Figure 5:
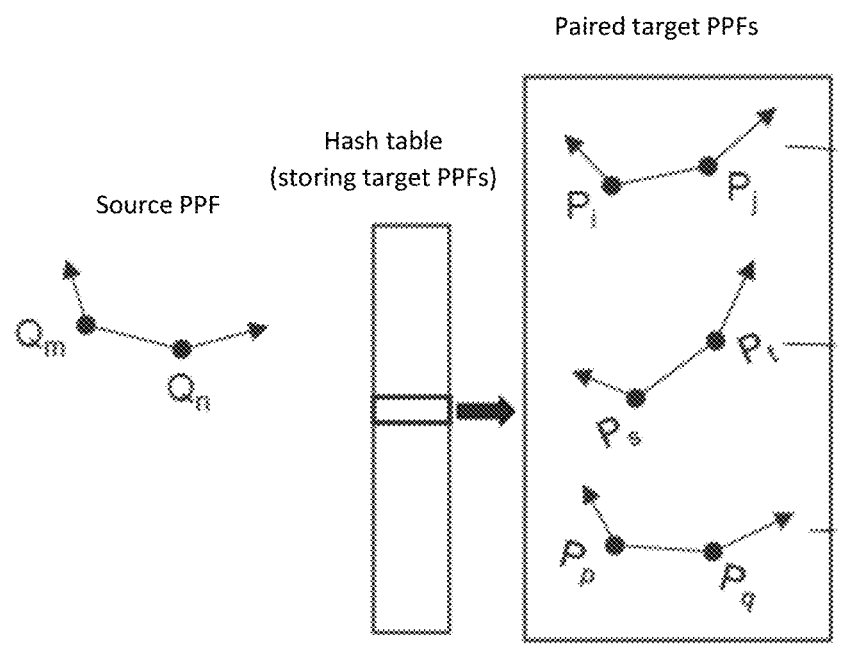
FIG. 5 illustrates a hash table lookup, according to some embodiments.

In some examples, the target PPFs may be stored in a hash table, which is searchable using the source PPF, as shown in FIG. 5. The hash table may be configured to return "similar" PPFs within a certain tolerance threshold. In some examples, it may not be possible to match one or more of the source PPFs with any of the target PPFs, these unmatched PPDs will not be involved in the rest of the process.

The voting unit 500 is configured to transform a first pair of points associated with a source PPF and/or a second pair of points associated with a target PPF. The pairs of points are transformed to align the location and edge direction of a first point associated with the target PPF with the location and edge direction of the reference point associated with the source PPF. The transformation is repeated for each matched source PPF and target PPF.

In some examples, the voting unit 500 may be configured to translate the first point associated with the target PPF and the reference point associated with the source PPF to a common origin point. Both pairs may be rotated to align the edge direction of the first point associated with the target PPF and the edge direction of the reference point associated with the source PPF direction with a common first axis.

Figure 6:
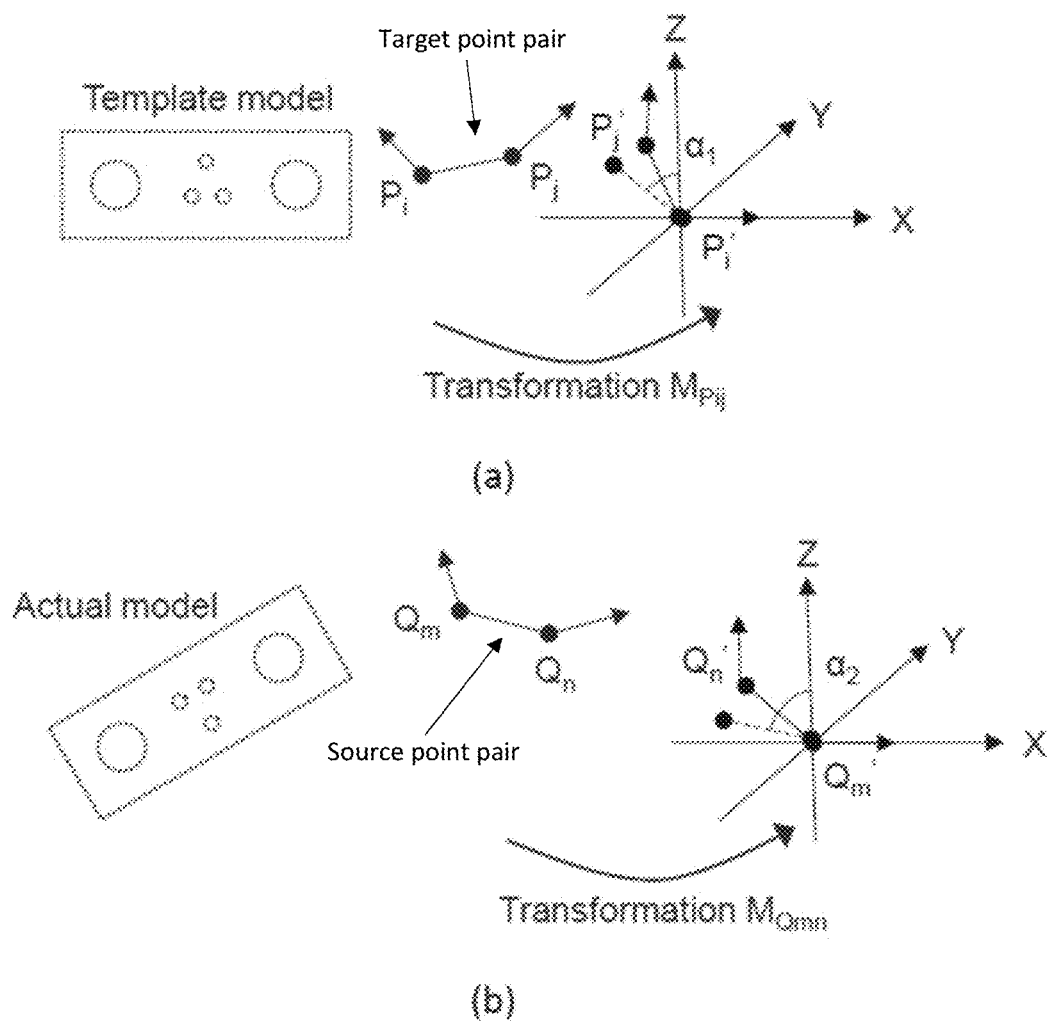
FIG. 6 illustrates transformations of point pair functions according to some embodiments.

FIG. 6 illustrates an exemplary transformation performed by the voting unit 500. In the template model, a target point pair $(P_i, P_j)$ may be translated by translating $P_i$ to the coordinate origin, and then rotated by aligning $P_i$'s direction with a reference axis, e.g. the x-axis. A transformation matrix including translation and rotation may be referred to as $M_{Pij}$. An angle $\alpha_1$ between the connecting line of the transformed $(P_i', P_j')$ and the z-axis may be computed. Similarly, in the actual model, a source point pair $(Q_m, Q_n)$ may be transformed by a matrix referred to as $M_{Qmn}$. An angle $\alpha_2$ may be computed based on the z-axis.

The voting unit 500 is configured to determine a rotation angle for each matched source PPF and target PPF to align a second point associated with the target PPF with a second point associated with the source PPF. That is, an angle $\alpha$ between the translated target point pair $(P_i', P_j')$ and the translated source point pair $(Q_m', Q_n')$ may be computed. Each set of matched point pairs therefore has an associated rotation angle $\alpha$ around the z-axis.

The voting unit 500 is further configured to identify a modal angle among the plurality of determined rotation angles.

In some examples, the voting unit 500 may be configured to quantize the range of possible angles and accumulate a vote for one rotation angle per each matched source PPF and target PPF.

The transformation unit 600 is configured to calculate an output transformation 30 from the source model 10 to the target model 20. The transformation unit 600 is configured to use the transformations applied to the points associated with each matched source PPF and target PPF for which the associated rotation angle is equal to the modal angle.

In some examples, the transformation unit 600 may be configured to calculate a transformation from the source model 10 to the target model 20 for each matched source PPF and target PPF for which the associated rotation angle is equal to the modal angle, and cluster the calculated transformations.

Figure 7:
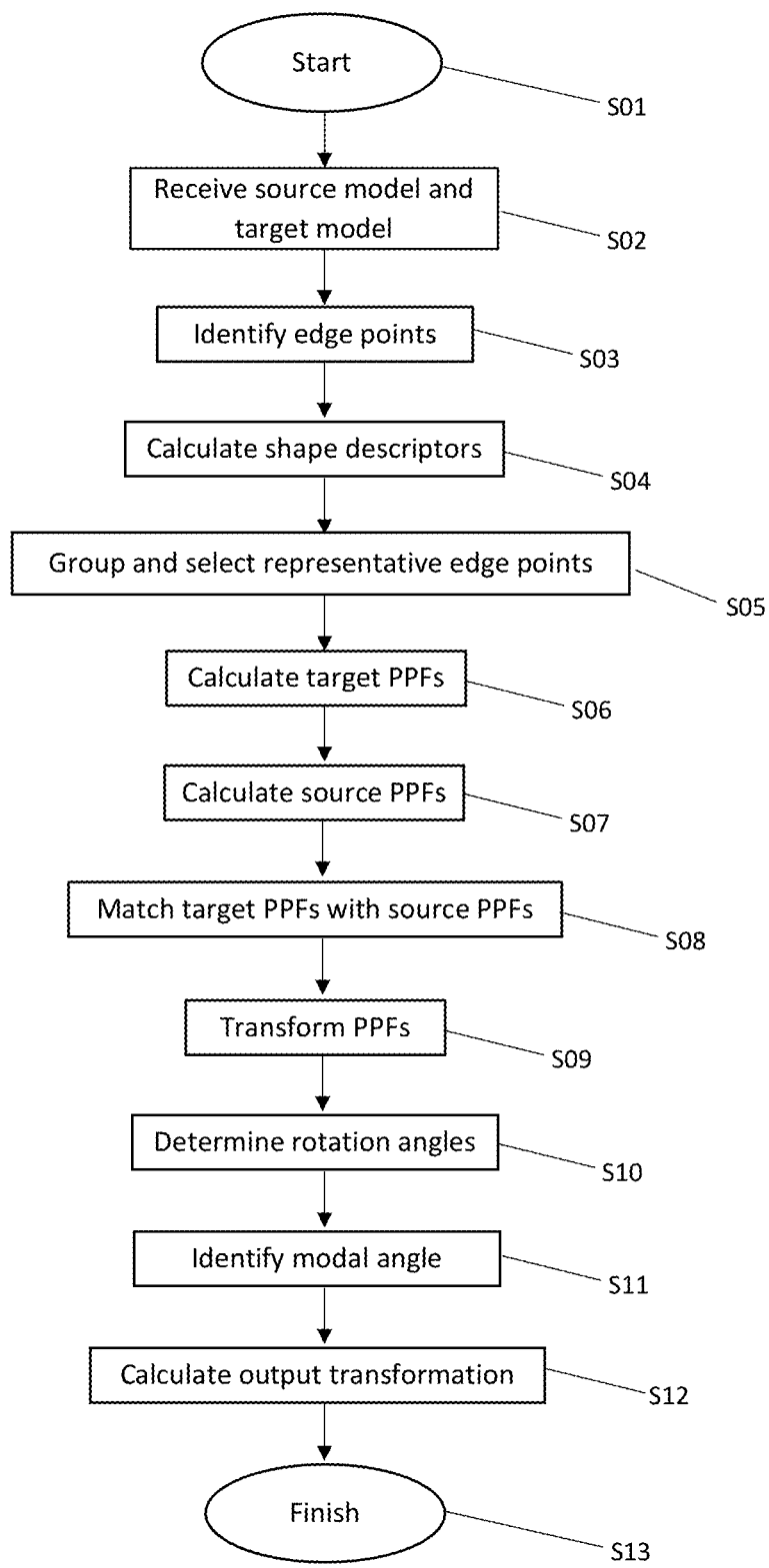
FIG. 7 shows a method of aligning a source model with a target model, according to an embodiment.

FIG. 7 shows a method of aligning a source model with a target model, according to an embodiment. The method starts at step S1.

At step S2, a source model and a target model are received.

In some examples, the source model may be an actual model based on real-word data and the target model may be a template model based on a computer generated template.

At step S3, a plurality of edge points are identified on each model. Each identified edge point is associated with an edge direction at a location of the edge point.

In some examples, identifying the edge points may include detecting a plurality of edges and sampling each edge to generate the plurality of edge points.

At step S4, a shape descriptor associated with each identified edge point is calculated.

In some examples, the shape descriptor for each point may be calculated using a plurality of nearby points within a predetermined radius.

In some examples, the shape descriptor may be calculated using a ratio between a length spanning the nearby points along the edge direction of the point and a width spanning the nearby points perpendicular to the edge direction of the point.

In some examples, the shape descriptor may be calculated using a histogram of the distances between each nearby point and a line extending through the point extending in the edge direction of the point.

In some examples, the shape descriptor may be calculated using values of linearity, planarity, surface variation and anisotropy.

At step S5, the edge points for each model are grouped according to the associated shape descriptors and one or more representative points are selected for each group of edge points.

At step S6, a target point pair feature (PPF) is calculated between each pair of representative points on the target model. The PPF defines the relative position and orientation of the pair of points.

In some examples, each point pair feature may be calculated using the distance between the points, the angle between the edge directions of the points, and the angles between the edge direction of each point and a connecting line extending between the points.

In some examples, each point pair feature may further include the calculated shape descriptor of the points.

At step S7, a source PPF is calculated between each of one or more specified representative points on the source model and each other representative point on the source model.

At step S8, one or more target PPFs are matched with each calculated source PPF.

In some examples, the target PPFs may be stored in a hash table, which is searchable using the source PPF.

At step S9, a first pair of points associated with a source PPF and/or a second pair of points associated with a target PPF are transformed to align the location and edge direction of a first point associated with the target PPF with the location and edge direction of the reference point associated with the source PPF. The transformation is repeated for each matched source PPF and target PPF.

In some examples, transforming the pairs of points may include translating the first point associated with the target PPF and the reference point associated with the source PPF to a common origin point. Both pairs may be rotated to align the edge direction of the first point associated with the target PPF and the edge direction of the reference point associated with the source PPF direction with a common first axis.

At step S10, a rotation angle is determined for each matched source PPF and target PPF to align a second point associated with the target PPF with a second point associated with the source PPF.

At step S11, a modal angle is identified among the plurality of determined rotation angles.

In some examples, identifying the modal angle may include quantizing the range of possible angles and accumulating a vote for one rotation angle per each matched source PPF and target PPF.

At step S12, an output transformation is calculated from the source model to the target model. The calculation uses the transformations applied to the points associated with each matched source PPF and target PPF for which the associated rotation angle is equal to the modal angle.

In some examples, calculating the output transformation may include calculating a transformation from the source model to the target model for each matched source PPF and target PPF for which the associated rotation angle is equal to the modal angle, and clustering the calculated transformations.

The method finishes at step S13.

The above embodiments are described by way of example only. Many variations are possible without departing from the scope of the disclosure as defined in the appended claims.

For clarity of explanation, in some instances the present technology may be presented as including individual functional blocks including functional blocks comprising devices, device components, steps or routines in a method embodied in software, or combinations of hardware and software.

Methods according to the above-described examples can be implemented using computer-executable instructions that are stored or otherwise available from computer readable media.

Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method of aligning a source model with a target model, the method comprising:
   receiving the source model and the target model;
   identifying a plurality of edge points on each model, where each edge point is associated with an edge direction at a location of the edge point;
   calculating a shape descriptor associated with each identified edge point;
   grouping the edge points for each model according to the associated shape descriptors and selecting one or more representative points for each group of edge points;
   calculating a target point pair feature, PPF, between each pair of representative points on the target model, wherein the PPF defines the relative position and orientation of the pair of points;
   calculating a source PPF between each of one or more specified representative points on the source model and each other representative point on the source model;
   searching for one or more target PPFs to match with each calculated source PPF;
   for each matched source PPF and target PPF:
      transforming the pair of points associated with the source PPF and/or the target PPF to align the location and edge direction of a first point associated with the target PPF with the location and edge direction of the reference point associated with the source PPF; and
      determining a rotation angle to align a second point associated with the target PPF with a second point associated with the source PPF;
   identifying a modal angle among the plurality of determined rotation angles; and
   calculating an output transformation from the source model to the target model using the transformations applied to the points associated with each matched source PPF and target PPF for which the associated rotation angle is equal to the modal angle;
   wherein the shape descriptor for each point is calculated using a plurality of nearby points within a predetermined radius; and
      wherein the shape descriptor is calculated using a ratio between a length spanning the nearby points along the edge direction of the point and a width spanning the nearby points perpendicular to the edge direction of the point; or
      wherein the shape descriptor is calculated using a histogram of the distances between each nearby point and a line extending through the point extending in the edge direction of the point; or
      wherein the shape descriptor is calculated using values of linearity, planarity, surface variation and anisotropy.

2. The computer implemented method of claim 1, wherein identifying the edge points includes detecting a plurality of edges and sampling each edge to generate the plurality of edge points.

3. The computer implemented method of claim 1, wherein each point pair feature is calculated using the distance between the points, the angle between the edge directions of the points, and the angles between the edge direction of each point and a connecting line extending between the points.

4. The computer implemented method of claim 3, wherein each point pair feature further includes the calculated shape descriptor of the points.

5. The computer implemented method of claim 1, wherein the target PPFs are stored in a hash table, which is searchable using the source PPF.

6. The computer implemented method of claim 1, wherein transforming the pairs of points comprises translating the first point associated with the target PPF and the reference point associated with the source PPF to a common origin point and rotating both pairs to align the edge direction of the first point associated with the target PPF and the edge direction of the reference point associated with the source PPF direction with a common first axis.

7. The computer implemented method of claim 1, wherein identifying the modal angle comprises quantizing the range of possible angles and accumulating a vote for one rotation angle per each matched source PPF and target PPF.

8. The computer implemented method of claim 1, wherein calculating the output transformation includes calculating a transformation from the source model to the target model for each matched source PPF and target PPF for which the associated rotation angle is equal to the modal angle, and clustering the calculated transformations.

9. The computer implemented method of claim 1, wherein the source model is an actual model based on real-word data and the target model is a template model based on a computer generated template.

10. A data processing apparatus comprising a processor configured to execute the computer-implemented method of claim 1.

11. A non-transitory computer-readable medium comprising instructions which, when executed by a processor, cause the processor to perform the method of claim 1.

* * * * *